(12) United States Patent
Tkachev

(10) Patent No.: US 9,094,388 B2
(45) Date of Patent: Jul. 28, 2015

(54) METHODS AND SYSTEMS FOR IDENTIFYING, VERIFYING, AND AUTHENTICATING AN IDENTITY

(71) Applicant: Dmitri Tkachev, New York, NY (US)

(72) Inventor: Dmitri Tkachev, New York, NY (US)

(73) Assignee: Dmitri Tkachev, New York, NY (US)

( * ) Notice: Subject to any disclaimer, the term of this patent is extended or adjusted under 35 U.S.C. 154(b) by 31 days.

(21) Appl. No.: 13/875,218

(22) Filed: May 1, 2013

(65) Prior Publication Data

US 2014/0331282 A1    Nov. 6, 2014

(51) Int. Cl.
*H04L 29/06*    (2006.01)

(52) U.S. Cl.
CPC .................................... *H04L 63/08* (2013.01)

(58) Field of Classification Search
CPC ....... H04L 63/08; H04L 9/32; H04L 63/0884; G06F 21/30; G06F 21/31
See application file for complete search history.

(56) References Cited

U.S. PATENT DOCUMENTS

| | | | |
|---|---|---|---|
| 5,363,448 A | 11/1994 | Koopman, Jr. et al. | |
| 5,541,994 A | 7/1996 | Tomko et al. | |
| 5,852,665 A | 12/1998 | Gressel et al. | |
| 6,016,476 A | 1/2000 | Maes et al. | |
| 6,041,410 A | 3/2000 | Hsu et al. | |
| 6,376,930 B1 | 4/2002 | Nagao et al. | |
| 6,758,394 B2 | 7/2004 | Maskatiya et al. | |
| 6,819,219 B1 | 11/2004 | Bolle et al. | |
| 6,980,672 B2 | 12/2005 | Saito et al. | |
| 6,981,016 B1 | 12/2005 | Ryan | |
| 7,047,419 B2 | 5/2006 | Black | |
| 7,079,007 B2 | 7/2006 | Siegel et al. | |
| 7,103,200 B2 | 9/2006 | Hillhouse et al. | |
| 7,207,061 B2 | 4/2007 | Martin | |
| 7,237,115 B1 | 6/2007 | Thomas et al. | |
| 7,239,727 B2 | 7/2007 | Taylor | |
| 7,246,244 B2 | 7/2007 | Nanavati et al. | |
| 7,266,379 B2 | 9/2007 | Blight et al. | |
| 7,269,737 B2 | 9/2007 | Robinson | |
| 7,281,135 B2 | 10/2007 | Black | |
| 7,305,562 B1 | 12/2007 | Bianco et al. | |

(Continued)

OTHER PUBLICATIONS

International Search Report and Written Opinion mailed Nov. 25, 2014 for International Patent Application No. PCT/US2014/54106 filed Sep. 4, 2014, all pages.

(Continued)

*Primary Examiner* — Izunna Okeke
(74) *Attorney, Agent, or Firm* — Kilpatrick Townsend & Stockton LLP

(57) ABSTRACT

A method of authenticating the identity of a user is disclosed. The method may include registering a user, where registering the user includes receiving identification of a plurality of individuals associated with the user and a communication address for each of the plurality of individuals. The method may also include receiving a request to authenticate the identity of the user. The method may further include selecting at least one of the plurality of individuals to serve as an authentication agent. The method may additionally include initiating at least a first communication between the user and the authentication agent via the communication address. The method may moreover include receiving a second communication from the authentication agent. The method may furthermore include sending a message indicating the identity of the user is authenticated based at least in part on the second communication including a confirmation of the identity of the user.

20 Claims, 15 Drawing Sheets

(56) References Cited

U.S. PATENT DOCUMENTS

| | | |
|---|---|---|
| 7,333,798 B2 | 2/2008 | Hodge |
| 7,363,505 B2 | 4/2008 | Black |
| 7,366,904 B2 | 4/2008 | Roh et al. |
| 7,372,979 B2 | 5/2008 | Hillhouse et al. |
| 7,431,207 B1 | 10/2008 | Neemann et al. |
| 7,433,826 B2 | 10/2008 | Korosec |
| 7,441,263 B1 | 10/2008 | Bakshi et al. |
| 7,481,364 B2 | 1/2009 | Cannon et al. |
| 7,492,928 B2 | 2/2009 | Hillhouse |
| 7,512,807 B2 | 3/2009 | Hillhouse |
| 7,525,537 B2 | 4/2009 | Abdallah et al. |
| 7,543,156 B2 | 6/2009 | Campisi |
| 7,587,611 B2 | 9/2009 | Johnson |
| 7,590,861 B2 | 9/2009 | Abdallah et al. |
| 7,594,122 B2 | 9/2009 | Milgramm et al. |
| 7,600,129 B2 | 10/2009 | Libin |
| 7,609,862 B2 | 10/2009 | Black |
| 7,609,863 B2 | 10/2009 | Black |
| 7,611,409 B2 | 11/2009 | Muir et al. |
| 7,613,427 B2 | 11/2009 | Blight et al. |
| 7,613,428 B2 | 11/2009 | Blight et al. |
| 7,636,854 B2 | 12/2009 | Muller et al. |
| 7,688,314 B2 | 3/2010 | Abdallah et al. |
| 7,699,703 B2 | 4/2010 | Muir et al. |
| 7,715,593 B1 | 5/2010 | Adams et al. |
| 7,716,486 B2 | 5/2010 | Libin et al. |
| 7,724,926 B2 | 5/2010 | Iannone |
| 7,769,695 B2 | 8/2010 | Robinson et al. |
| 7,773,779 B2 | 8/2010 | Shalev et al. |
| 7,778,933 B2 | 8/2010 | Robinson et al. |
| 7,783,892 B2 | 8/2010 | Russell et al. |
| 7,788,501 B2 | 8/2010 | Abdallah et al. |
| 7,804,956 B2 | 9/2010 | Chang et al. |
| 7,815,507 B2 | 10/2010 | Parrott et al. |
| 7,822,232 B2 | 10/2010 | Black |
| 7,822,989 B2 | 10/2010 | Libin et al. |
| 7,827,410 B2 | 11/2010 | Korosec |
| 7,836,103 B2 | 11/2010 | Li et al. |
| 7,836,485 B2 | 11/2010 | Robinson et al. |
| 7,844,252 B2 | 11/2010 | Hodge |
| RE42,038 E | 1/2011 | Abdallah et al. |
| 7,917,769 B2 | 3/2011 | Campisi |
| 7,933,507 B2 | 4/2011 | Jelinek et al. |
| 7,937,039 B2 | 5/2011 | Wong et al. |
| 7,937,590 B2 | 5/2011 | Wuidart |
| 7,949,867 B2 | 5/2011 | Deshpande et al. |
| 7,949,869 B2 | 5/2011 | Deshpande et al. |
| 7,950,063 B2 | 5/2011 | Oelsner |
| 7,961,917 B2 | 6/2011 | Black |
| 8,001,372 B2 | 8/2011 | Abdallah et al. |
| 8,015,597 B2 | 9/2011 | Libin et al. |
| 8,019,282 B2 | 9/2011 | Blight et al. |
| 8,041,956 B1 | 10/2011 | White et al. |
| 8,045,764 B2 | 10/2011 | Hamza |
| 8,049,812 B2 | 11/2011 | Whillock et al. |
| 8,050,463 B2 | 11/2011 | Hamza |
| 8,055,906 B2 | 11/2011 | Abdallah et al. |
| 8,063,889 B2 | 11/2011 | Anderson |
| 8,064,647 B2 | 11/2011 | Bazakos et al. |
| 8,065,529 B2 | 11/2011 | Hively |
| 8,073,756 B1 | 12/2011 | Lapsley et al. |
| 8,078,534 B1 | 12/2011 | Nichols et al. |
| 8,085,993 B2 | 12/2011 | Jacobson |
| 8,090,157 B2 | 1/2012 | Hamza et al. |
| 8,090,246 B2 | 1/2012 | Jelinek |
| 8,094,021 B2 | 1/2012 | Nichols et al. |
| 8,098,129 B2 | 1/2012 | Falck et al. |
| 8,098,901 B2 | 1/2012 | Hamza |
| 8,127,143 B2 | 2/2012 | Abdallah et al. |
| 8,132,226 B1 | 3/2012 | Bianco et al. |
| 8,135,957 B2 | 3/2012 | Dinges et al. |
| 8,144,941 B2 | 3/2012 | Adams et al. |
| 8,164,451 B2 | 4/2012 | Nichols et al. |
| 8,186,580 B2 | 5/2012 | Cannon et al. |
| 8,210,429 B1 | 7/2012 | Bohen et al. |
| 8,222,999 B2 | 7/2012 | Hiramatsu, at al. |
| 8,229,178 B2 | 7/2012 | Zhang et al. |
| 8,229,821 B2 | 7/2012 | Mennie at al. |
| 8,538,065 B2 | 9/2013 | Bladel et al. |
| 2001/0056487 A1 | 12/2001 | Yoo |
| 2003/0061172 A1 | 3/2003 | Robinson |
| 2005/0171787 A1 | 8/2005 | Zagami |
| 2008/0102790 A1 | 5/2008 | Schultz |
| 2009/0007234 A1 | 1/2009 | Birger et al. |
| 2012/0110640 A1 | 5/2012 | Donelson et al. |
| 2012/0159647 A1 | 6/2012 | Sanin et al. |
| 2012/0284090 A1 | 11/2012 | Marins et al. |
| 2013/0036459 A1 | 2/2013 | Liberman et al. |
| 2013/0073974 A1* | 3/2013 | Bladel et al. .................. 715/739 |
| 2013/0117154 A1 | 5/2013 | Zhou |

OTHER PUBLICATIONS

US 7,420,545, 09/2008, Abdallah et al. (withdrawn)

\* cited by examiner

METHODS AND SYSTEMS FOR IDENTIFYING, VERIFYING, AND AUTHENTICATING AN IDENTITY

BACKGROUND OF THE INVENTION

Current identity verification systems and methods for security purposes, including, but not limited to, personal identity cards, passports, passwords, personal handheld devices, symmetric and asymmetric encryption, public-key cryptography, multi-factor authentication methodologies, including biometric identity verification (fingerprint, retina scans, body structure, physical and chemical composition on molecular and atomic levels, etc.) are subject to replication and man-in-the-middle attacks, as these identification features can be replicated with no deviations from the original. These systems rely on possession of physical and digital keys, physical features, or characteristics of the user which thus increases the opportunity for attack and decreases security by relying on identity verification subject to information given by the user. This security risk is as applicable to remote identity verification systems as it is to physical in-person identity checks because it relies on physical properties, objects, or knowledge that a user must provide. This makes current remote identity verification systems inherently insecure against man-in-the-middle attacks allowing intruders to gain access by means of replication.

Further risks are present when a user himself performs or is involved in the process of verifying his identity; in addition to the risks of traditional man-in-the-middle attacks, possession of private keys can be obtained by means of coercion or extortion, whether direct or indirect. In such instances the ability to detect intrusion is minimal, as the user may not be able to report the intrusion until after the attack is over. Even the implied security strength of a one-time pad, or any other single-use encryption key, is diminished against such an intrusion.

In the event a user loses access information, current identity verification systems are insecure, inconvenient, and time consuming when providing reset functionality as they require additional information from the user or rely on third-party services to reset access to a system. A user may lose access information via loss of a one-time pad, password, private key, memory, physical characteristic (biometric data points damage, for example, damage to facial, fingerprint, iris, DNA, etc.), mobile device, wearable device, or mobile token generator. Further, in situations where even one version of a user's identification feature or security credentials such as, for example, a password becomes compromised, a chain reaction (a sequence of reactions where a product or by-product of one event causes additional reactions and events to take place) of security breaches for a particular user or group of users across multiple access points may also be compromised where the same identification feature or security credential provides access at all such access points. Alternatively, in systems where password or access reset procedures are not available for security reasons, such as, for example, encrypted file storage, complete loss of access may occur.

Even when encryption and decryption algorithms are used, their use may be complicated by the inability of a user to remember multiple password or key combinations. Also, the requirement of the user to change access keys or passwords on a regular basis is time consuming and subject to eavesdropping and password or key capture. In addition, many current access systems cannot prevent a user that has provisions for access from accessing the system whether consciously, for malicious purposes, or unconsciously, in situations where the user has an altered state of mind due to chemical imbalances within the body from natural causes or under influence of outside elements, whether chemical, physical or alternative agents impacting their behavior or mental state.

BRIEF SUMMARY OF THE INVENTION

In one embodiment, a method of authenticating the identity of a user is provided. The method may include registering a user, where registering the user includes receiving identification of a plurality of individuals associated with the user and a communication address for each of the plurality of individuals. The method may also include receiving a request to authenticate the identity of the user. The method may further include selecting at least one of the plurality of individuals to serve as an authentication agent. The method may additionally include initiating at least a first communication between the user and the authentication agent via the communication address. The method may moreover include receiving a second communication from the authentication agent. The method may furthermore include sending a message indicating the identity of the user is authenticated based at least in part on the second communication including a confirmation of the identity of the user.

In another embodiment, a non-transitory computer-readable medium containing instructions stored thereon for implementing a method of authenticating the identity of a user of a client device is provided. The method may include sending, from the client device to a remote server, a request to authenticate the identity of the user. The method may also include receiving, at the client device from the remote server, a first instruction to initiate at least a first communication between the user and a first authentication agent. The method may further include initiating, with the client device, the first communication. The method may additionally include receiving, at the client device from the remote server, a message indicating the identity of the user is authenticated based at least in part on a second communication received by the remote server from the first authentication agent confirming the identity of the user.

In another embodiment, a server configured to authenticate the identity of a user is provided. The server may include a processor and a storage medium including instructions executable by the processor. The instructions may be executable to receive a request to authenticate the identity of the user. The instructions may also be executable to select at least one of a plurality of individuals to serve as an authentication agent. The instructions may further be executable to initiate at least a first communication between the user and the authentication agent. The instructions may additionally be executable to receive a second communication from the authentication agent. The instructions may moreover be executable to send a message indicating the identity of the user is authenticated based at least in part on the second communication including a confirmation of the identity of the user.

BRIEF DESCRIPTION OF THE DRAWINGS

Many aspects of the present disclosure can be better understood with reference to the following figures. Moreover, in the drawings, like reference numerals designate corresponding parts throughout the several views.

DETAILED DESCRIPTION OF THE INVENTION

Figure 1:
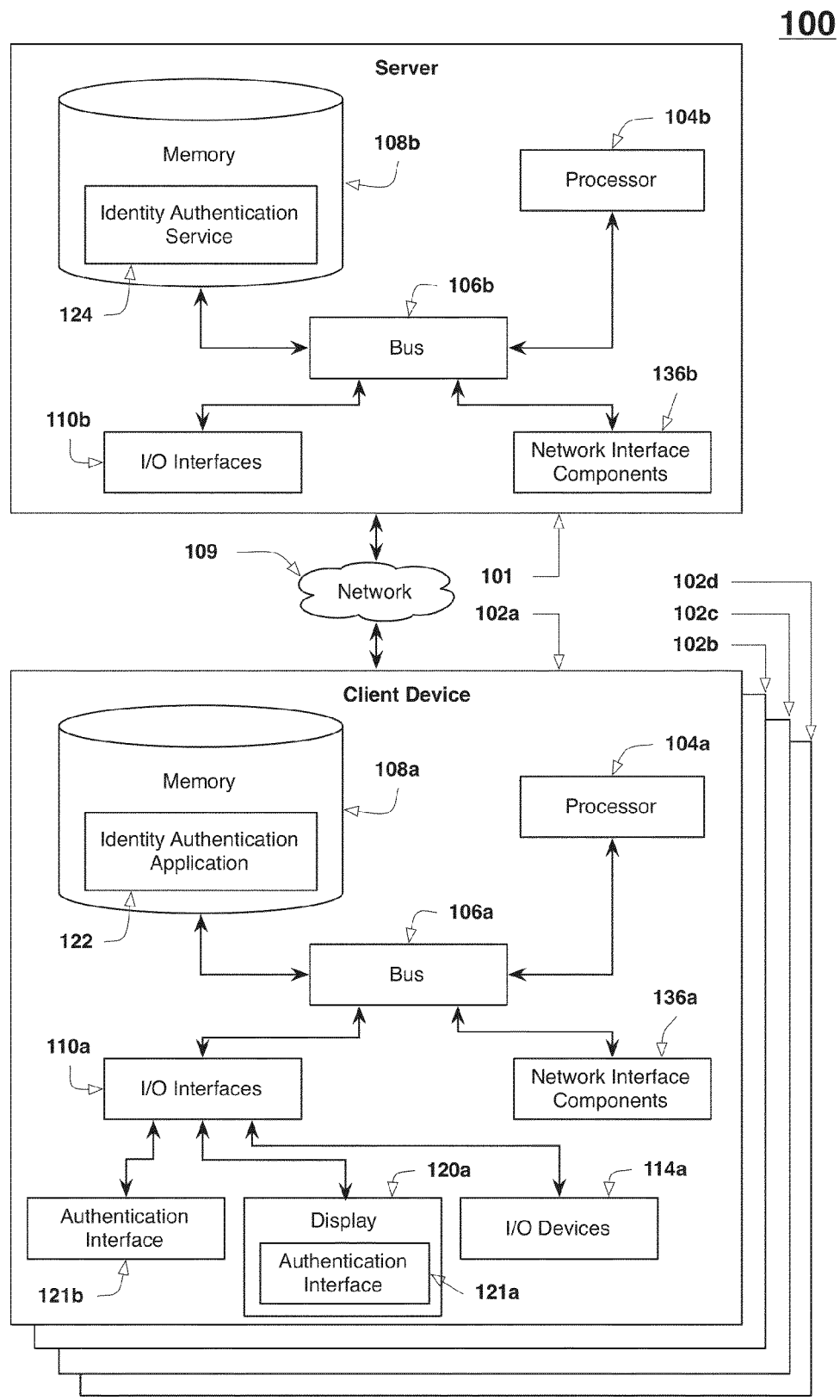
FIG. 1 is a block diagram showing an exemplary client system configured to provide a user identification tool.

The ensuing description discloses exemplary embodiments only, and is not intended to limit the scope, applicability, or configuration of the disclosure. Rather, the ensuing description of the exemplary embodiments will provide those skilled in the art with an enabling description for implementing various possible embodiments. Various changes may be made in the function and arrangement of elements without departing from the spirit and scope of the invention as set forth in the appended claims.

Specific details are given in the following description to provide a thorough understanding of the described embodiments. However, it will be understood by one of ordinary skill in the art that the embodiments may be practiced with or without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. Finally, any detail discussed with regard to one embodiment may or may not be present in any other described or implicit embodiment of the invention. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments include client devices configured to provide an effective mechanism for dynamically providing identity verification and authentication of a user utilizing the user's social circle of established relationships as verification agents. For the purposes of this disclosure, "verification" and "authentication," as well as their assorted forms, may be used interchangeably, and may mean to prove, confirm, substantiate, and/or establish the truth of a given assertion or matter. For example, client devices may execute an application or applications, embodied in a non-transitory computer-readable medium, that include instructions for performing the methods of verifying and/or authenticating an identity of a user, and authorizing access to a system or services described herein based on successful verification and/or authentication.

In some embodiments, upon initiation of an authentication request by the user in need of verifying his identity, the system may initiate a process in which it dynamically and randomly selects one or more pre-approved members of the user's social circle, creating a list of authentication agents made up of the selected members. The pre-approved members may themselves be selected during a vetting process applied to individuals submitted by the user as belonging to their social circle. The system then initiates a secure communication or a series of communication sessions between the user and each respective authentication agent for the two parties in each pair to interact in a written (chat), oral (voice), or visual (video) manner, depending on device capability and/or availability for each respective party.

Via secure communications, the system enables the user and the chosen verification agent to interact so that the verification agent can verify the identity of the user. These communications may take from a few seconds to as long as necessary for the authentication agent to ensure that they are interacting with the person they are to identify. Additionally, communications may occur in real time (i.e., telephone, voice chat, video chat) or via delayed methods (i.e., text message, emails, etc.), or a combination of multiple communication methods established either concurrently or sequentially. In some embodiments, the user and the chosen verification agent may be in close proximity so that personal face-to-face communication may instead occur, without the need to establish a secure communication transmission or connection between the two individuals, while still maintaining the secure communication channel with each respective individual. Once the authentication agent is confident of the user's identity, based on his or her prior knowledge of the user in question relative to current interaction established by embodiments of the invention with the user, the authentication agent provides a confirmation to the system by means of visual, oral, physical feedback, a combination of these means, and/or a predetermined sequence of actions/events.

The system records the outcome (whether confirmation or rejection) from the current authentication agent and repeats the process with as many authentication agents as necessary to either meet or fail to meet predefined security requirements, dynamically cycling through the user's vetted authentication agents of his social circle stored within the user's verification profile together with user-specific security policy and notification triggers, other user-specific data points and conditions, as well as other conditions necessary for a user to satisfy prior to receiving authentication confirmation. Once the required number of identity authentication confirmations is received, the system issues a confirmation of the user's identity, which may be used to grant access or authorization for the user to a particular system, service, or trigger a predefined sequence of actions, etc.

This illustrative embodiment employs a user's social circle of established social relationships and peer-to-peer human connections to dynamically provide verification and authentication of a user's identity, so that authorization may be granted to the user to access a provided system or service. In some embodiments then, this process relies on a dynamically created and randomly selected, in compliance with pre-specified rules, set of a user's social connections to verify the user's identity. The user's social circle may include, but is not limited to, the user's family members, friends, colleagues, acquaintances, and individuals in close and/or regular contact with the user. Embodiments herein allow for incorporating additional predefined authorization agents based on security requirements, for example in corporate, government, and high security environments. The method ensures randomization of verification counterparts within the user's social circle to avoid repetitive selection, thus minimizing chances of security attacks and actual breaches.

FIG. 1 is a block diagram showing an exemplary networked environment 100 for implementation of various embodiments of the invention. The networked environment includes a server 101, a plurality of client devices 102 and a network 109. The server 101 and the plurality of client devices 102 are connected to or capable of connecting to the network 109. The network may be or include, for example, any type of wireless network such as a wireless local area network (WLAN), a wireless wide area network (WWAN) or any other type of wireless network now known or later developed. Additionally, the network 109 may be or include the Internet, intranets, extranets, microwave networks, satellite communications, cellular systems, PCS, infrared communications, global area networks, or other suitable networks, etc., or any combination of two or more such networks. The network 109 facilitates transmission of communications and resources between or among two or more of the client devices 102.

The server 101 may comprise, for example, a server computer or any other system for providing the identity authorization services as described herein to the client device(s) 102. In some embodiments, a plurality of servers 101 may be employed and arranged, for example, in one or more server banks or computer banks or other arrangements. In some embodiments, a plurality of otherwise independent devices, possibly mobile client devices, may act in unison/concert to provide similar functionality as server 101. For example, a plurality of servers 101 together may comprise a cloud computing resource, a grid computing resource, and/or any other distributed computing arrangement. Such servers 101 may be located in a single installation or may be distributed among many different geographic locations. For purposes of convenience, the server 101 is referred to herein in the singular. A client device 102 may comprise a desktop, a laptop, a tablet, a PDA, a mobile phone or any other suitable computing device configured for performing or participating in the identity verification processes as described herein.

The server 101 and each client 102 include a processor 104$a,b$ and a memory 108$a,b$ for storing data, software application programs, program modules, software services and processes, and other computer-executable instructions. The processor 104$a,b$ has access via bus 106$a,b$ or other appropriate interface to the memory 108$a,b$ and is configured for executing the computer-executable instructions included in the various application programs and services. A memory 108$a,b$ may be any tangible computer-readable medium, such as RAM, ROM, cache, or Flash memory and/or any other integrated, removable, or otherwise accessible storage medium. Software applications and services stored in the memory 108$a,b$ may include an operating system, an "identity authentication application" 122 (client device 102), an "identity authentication service" 124 (server 101) and any other suitable application program(s), software module(s), software component(s), etc. As used herein, the terms "identity authentication application" 122 and "identity authentication service" 124 are intended to represent software application(s) and service(s) for performing the client-side and server-side functions, respectively, of the identity authentication processes described herein.

Each client device 102 may also include input-output (I/O) interface components 110, which may comprise one or more other busses, ports, or other interconnections etc. for facilitating connection with various devices included in or interfaced to client platform 102, such as a display device 120 and other I/O devices 114 (e.g. a mouse, keyboard, touch screen interface, etc.). These components may optionally be included in the server 101 as well.

The server 101 and each client device 102 also includes a network interface 112$a,b$, which may include a wired network connectivity component, for example, an Ethernet network adapter, a modem, and/or the like. A networking interface 112$a,b$ may further include a wireless network connectivity component or interface for a wireless network connectivity component, for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The server 101 and each client device 102 may thus be operable to communicate with other network devices via a wired and/or wireless connection to the network 109. Other components of typical computing devices and networks are well-known in the art but, for the sake of brevity, are not explicitly described herein.

Figure 2:
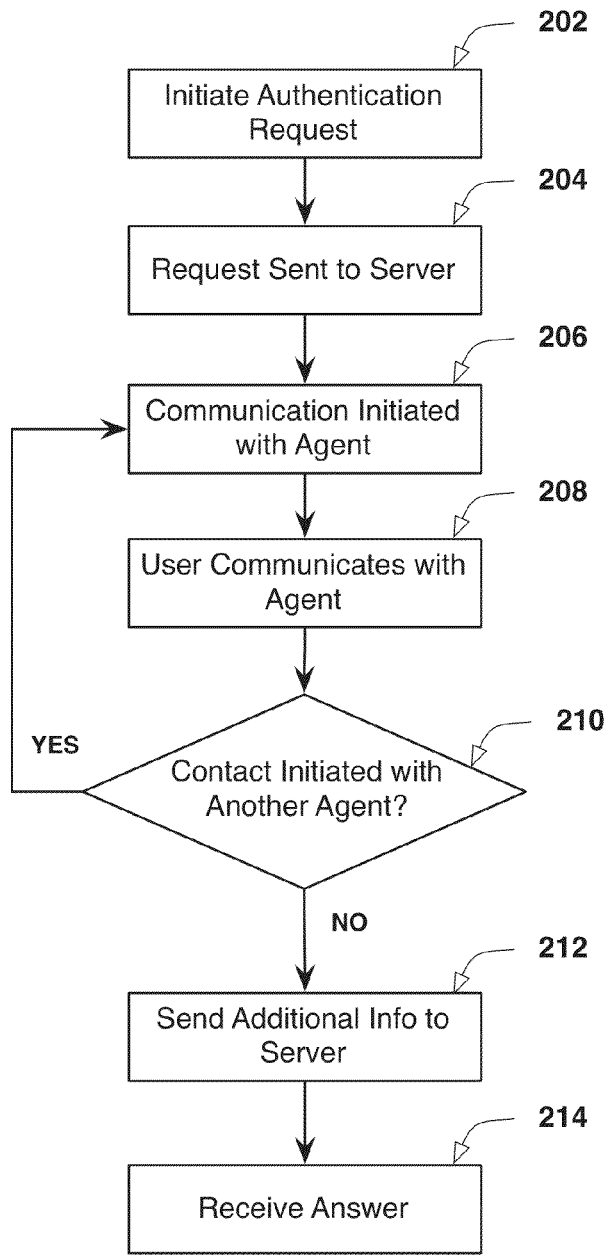
FIG. 2 is a block diagram showing an exemplary method performed by an identity authentication application on a client device.

FIG. 2 is a diagram showing steps in an exemplary method 200 of verifying the identity of a user from the perspective of the client device 102. At block 202, the user initiates a request via an authentication interface 121*a,b* generated by the identity authentication application 122 that can be established by several means 121*b* such as being displayed 121*a* on the client device 102. At block 204, the identity authentication application 122 sends the request to the identity authentication service 124.

At block 206, a communication is initiated between the user and a first authentication agent. This communication may be accomplished on the client device 102 via voice, text, e-mail, or any other available means of the client device 102, or may be accomplished using another device, for example, a separate telephone line, computing device, etc. The communication may be one or more discrete communications, or may be via a continuous communication connection for a duration of time. Furthermore, the communications may or may not pass through the server 101. In some embodiments the server 101 may facilitate, and possibly monitor the communication, while in other embodiments it may facilitate establishment of the initial connection between user and authentication agent by provision of secure encryption keys to allow a user and verification agent to establish the session, hence ensuring that the communication is secured by means of individual encryption keys without which the communication cannot take place, while the pathway of the connection may not necessarily be facilitated directly by the server and can be done in a decentralized manner via public networks/communication channels, and/or an array of intermediaries.

At block 208, the user communicates with the first authentication agent until the first authentication agent can either confirm or reject the identity of the user to identity authentication service 124 that the user is who he/she says he/she is. The first authentication agent may confirm this by recognizing, as one of potential identification targets, the speech, visual expressions of the user, discussing shared experiences, etc.

At block 210, if the identity authentication service 124 determines, or has determined, that further authentication agents are necessary to authenticate the user, then the identity authentication service 124 may cause the user to submit to further identity authentication by repeating the process of blocks 206, 208 with another authentication agent selected by identity authentication service 124. This may occur in embodiments where multiple independent authentication checks are required for the specific identity verification process performed.

At block 212, once all authentication agents selected by the identity authentication service 124 have been communicated with, the client device 102 may send additional information necessary for verification, as will be discussed herein, to identity authentication service 124. At block 214, client device 102 may receive an answer from the server 101 regarding the requested authentication. This response may either be affirmative or negative based on an evaluation by the server 101 of the information received from the authentication agents and the client device 102.

Figure 3:
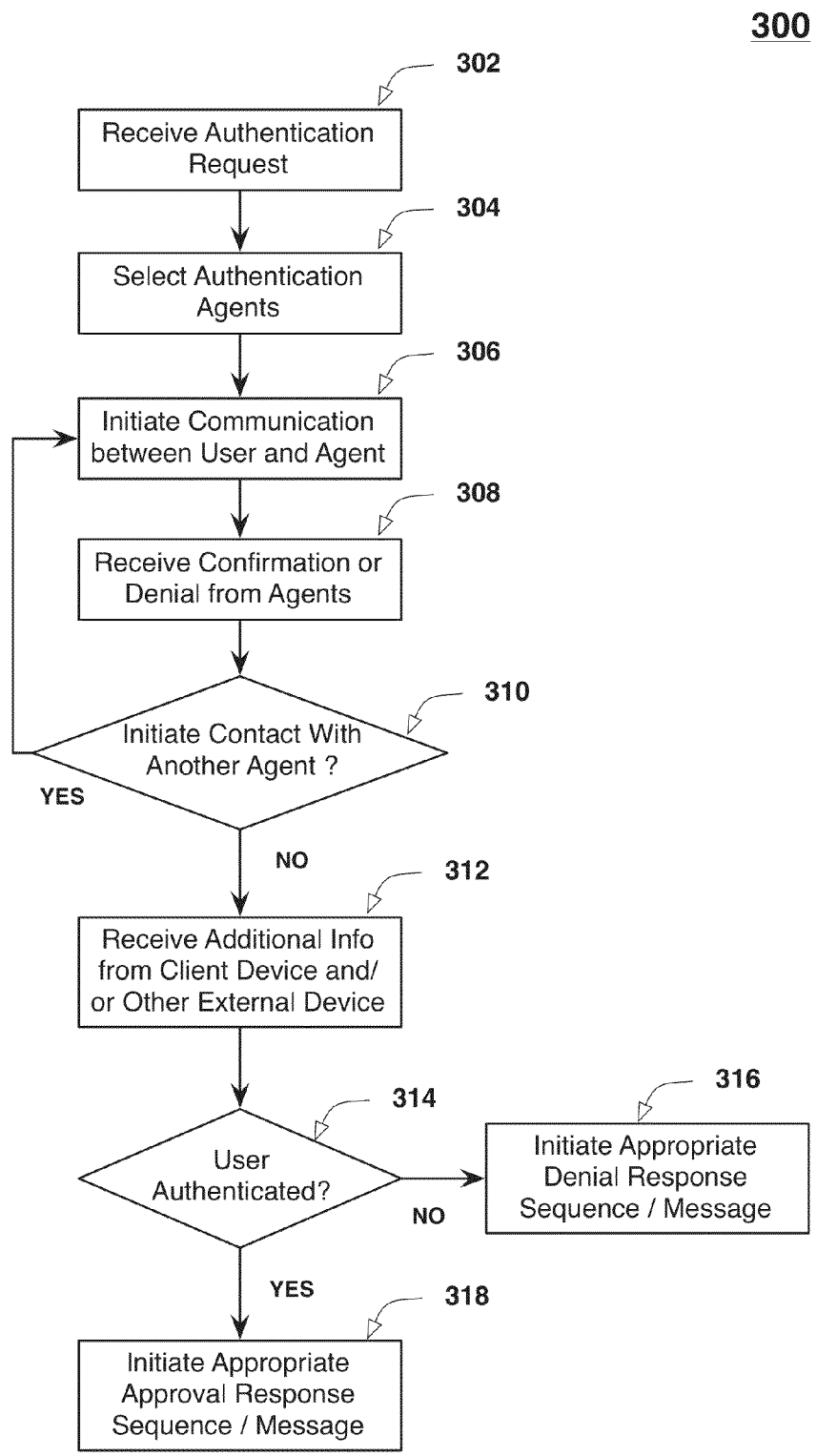
FIG. 3 is a block diagram showing an exemplary method performed by an identity authentication service on a server.

FIG. 3 is a diagram showing steps in an exemplary method 300 of verifying the identity of a user from the perspective of the server 101. At block 302, the identity authentication service 124 receives a request to authenticate the identity of a user. At block 304, the identity authentication service 124 selects authentication agents associated with the user. How these agents are selected will be discussed below with respect to FIG. 4.

At block 306, a communication is initiated between the user and a first authentication agent. This communication may be accomplished on the client device 102 via voice, text, e-mail, or any other available means of the client device 102, or may be accomplished using another device, for example, a separate telephone line, computing device, etc. At block 308, the identity authentication service 124 receives a confirmation or denial from the authentication agent that the user is who he/she claims to be.

At block 310, if the identity authentication service 124 determines, or has determined, that further authentication agents are necessary to authenticate the user, then the identity authentication service 124 may cause the user to submit to further identity authentication by repeating the process of blocks 306, 308 with another authentication agent selected by identity authentication service 124 (perhaps at block 304). This may occur in embodiments where multiple independent authentication checks are required for the specific identity verification process performed. While one authentication session is in process, the system may automatically check the availability of other identification agents of user's social circle, and queue them accordingly to minimize potential delays between authentication sessions between the user and each respective identification agent.

Which, and how many, authentication agents are selected from the user's social circle may be dependent on a number of factors, which can be predefined for each specific application of authentication session and stored accordingly in the user profile as will be discussed herein. Additionally, the weight accorded to any given authentication agent may also be dynamic, and also therefore affect the number of authentication agents determined necessary for a particular authentication.

Once all identity authentications have occurred with the selected authentication agents, additional information may be received from the client device at block 312. This information, as will be discussed herein, may provide further data points that can be analyzed to authenticate the user. At block 314, the identity authentication service 124 may determine whether the user is authenticated from the information collected at blocks 308, 312. Additionally or alternatively, a notification may also be sent to an entity, service, or system requesting further authentication of the user's identity.

If the first authentication agent, an authentication agent subsequent to the first, or a threshold number or portion of the authentication agents do not confirm the identity of the user, then at block 316, authentication of the user's identity is denied and the identity authentication service 124 may send an authentication denial message to client device 102 and/or an entity, service, or system requesting authentication of the user's identity. However, if the first authentication agent, an authentication agent subsequent to the first, or a threshold number or portion of the authentication agents do not confirm the identity of the user, then at block 318, authentication of the user's identity is confirmed and the identity authentication service 124 may send an authentication approval message to client device 102 and/or an entity, service, or system requesting authentication of the user's identity.

Social Circle: Human Bonds, Relationships and Peer-to-Peer Connections

The user's social circle is a set of individuals who are connected by some relationship to the user, which can be personal, and/or professional, and/or required by third party agents (government officials, border control, public servants, police officers, border agents, etc.). For example, individuals in the user's social circle may include friends, family members, acquaintances, colleagues, or any other person associated with the user.

In some embodiments, members of the user's social circle may be provided by third parties whose systems and processes will use the instant system to verify the identity of a person attempting access. For example, depending on the purpose of authentication and associated security requirements, such as corporate, government, high security applications, additional functionality allows adding specific pre-defined members such as administrators, IT support, managers, supervisors, etc., to the list of identification agents to be contacted as required for access. In these instances, in addition to using one's traditional social circle the access at that specific authentication step for that particular application will only be provided once the user is authenticated by the specific member of a group (administrators, IT support, managers, supervisors, authorized external parties) in addition to the agents selected from members of the user's personal social circle.

Dynamic Trustworthiness Factor Assessment

At each step the system may dynamically calculate and take into the account the trustworthiness factor of both the verification agent and user to structure verification policies in accordance with fraud minimization techniques. Thus, at any time the system may determine that adequate information has been received to make an authentication determination, regardless of a whether a positive or negative authentication determination will be made. Likewise, at any time the system may determine that the authentication process is not complete, and requires further data, via either authentication agents or other sources, to make a final determination.

Initially, all suggested agents are eligible to act as verification agents as long as they are willing to participate in the program and act as verification agents for the user who selected them to act as verification agents. However, over time as more and more verification sessions take place, a pattern will appear of some verification agents always being responsive in their availability and responsible in their judgment, respectively, while others being out of reach or irresponsible, resulting in false-negative verification outcomes, in instances when they intentionally decided to reject the confirmation requests to play a prank or be rude or disrespectful to the user who asked to be verified. Similar data aggregation and analytics methodologies are used by the service to analyze how many false positive and false negative outcomes each particular verification agent provided versus the overall number of verification sessions. The system will analyze for presence of any specific patterns, for example, when the largest amount of incorrect verification outcomes for a particular verification agent took place during a certain time window, and will ensure in the future to avoid using this particular person as a verification agent during that time window, will reduce the trustworthiness score of this person as a verification agent and will initiate fewer verification requests. The system can analyze the trustworthiness of verification outcomes both on a per user basis and per verification agent basis.

Trustworthiness Factor Verification Parameters

However, if a verification agent is already a registered user of the service with its own circle of verification agents, this will naturally increase the initial trustworthiness of this particular agent, as it reduces a chance of man-in-the-middle attack, where multiple fake accounts have been created for the sole purpose of stealing someone's identity done by creating a fake identity of a user who had not yet created a profile and verifying it by a set of fake verification agents to obtain fake identity of that user unaware of the fraud attempt.

Additional verification parameters may include but are not limited by the amount of time a person had the profile, the amount of social connections and interactions in the public domain within social networks, as well as personal publications, appearances in press, length of time that person had profiles at social networks, as well as confirmations from public databases, corporate and government agencies, etc. For example, a user with little social activity and recently established public social profiles, might require additional verification steps versus the ones who have been active, on a relative basis, as it would prevent someone from receiving a validation.

In addition, for those verification agents with the lowest rates of false-negative and false-positive verification sessions as well as those with the most availability or quickest reaction time, the system provides an incentive-based system.

In one of the implementations, for some of the less critical verification sessions, the system provides an ability for the user to hire a designated agent or group of agents, reducing the strain on members of the user's social circle for some of the less critical verification sessions. This can be particularly applicable to large volumes of verification requests in corporate settings, where a designated set of verification agents might be used in addition to a user's social circle, colleagues, and administrators.

In addition for new users a system might use traditional means of in-person calls, identity checks, communication via traditional communication channels such as email and post mail to notify the user of the profile creation and verify user identity by traditional identity verification measures and techniques.

Registration Process

Figure 4:
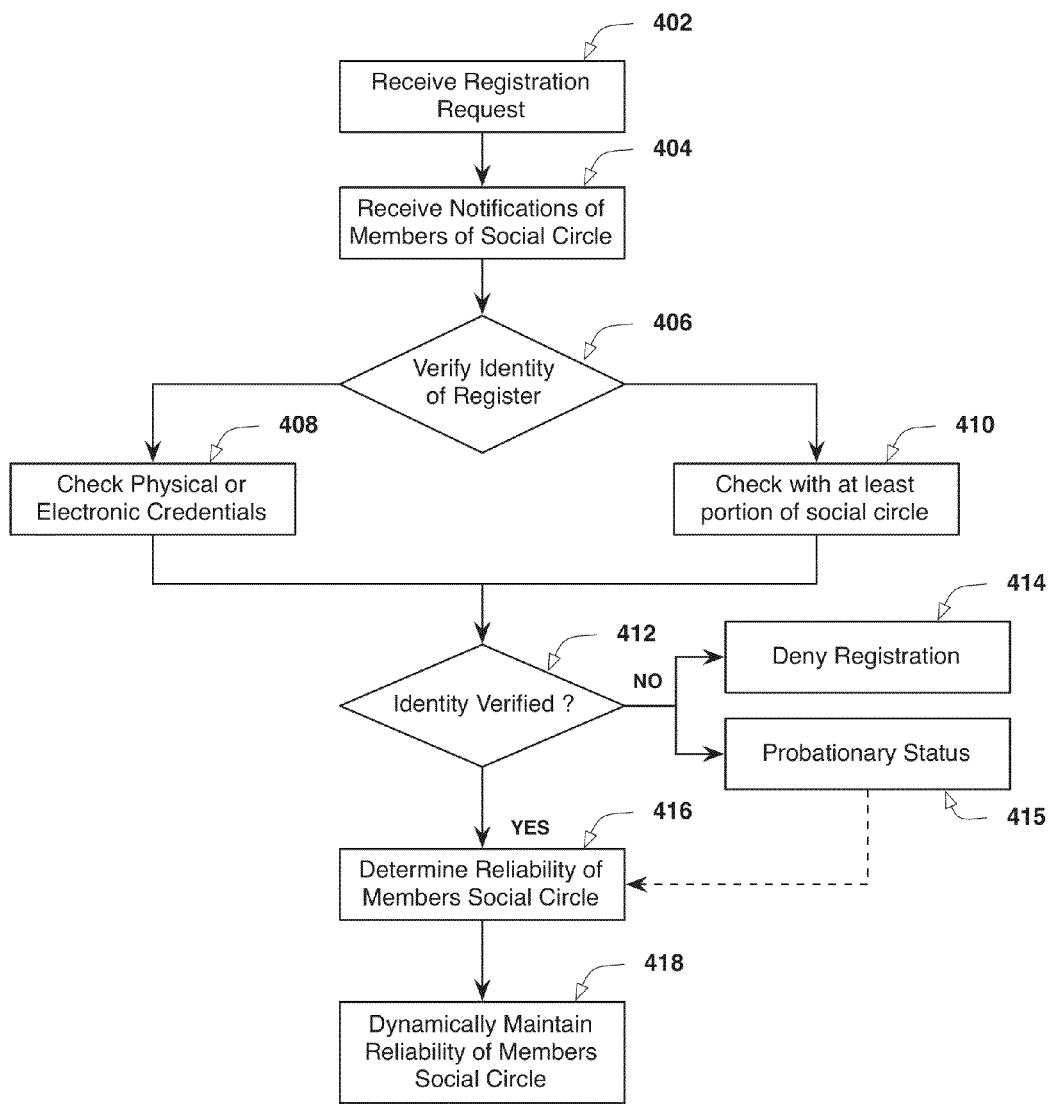
FIG. 4 is a block diagram showing an exemplary registration process for a user of the systems and methods herein.

FIG. 4 is a block diagram showing an exemplary registration process 400 for a user of the systems and methods disclosed herein. At block 402, a server 101 receives a registration request from a user. At block 404, the server 101 receives notification of who are members of the social circle of the user. The user's social circle is a set of individuals who are connected by some relationship to user. For example, individuals in the user's social circle may include friends, family members, acquaintances, colleagues, or any other person(s) associated with the user who knows the user well enough to act as a verification agent.

In some embodiments, members of the user's social circle may be provided by third parties whose systems and processes will use the instant system to verify the identity of a person attempting access. For example, depending on the purpose of authentication and associated security requirements, such as corporate, government, and/or high security applications, additional functionality allows adding specific pre-defined members such as administrators, IT support, managers, supervisors, etc., to the list of identification agents to be contacted as required for user verification and access. In these instances, in addition to using one's traditional social circle the access at that specific authentication step for that particular application will only be provided once the user is authenticated by the specific member of a group (administrators, IT support, managers, supervisors, authorized external parties) in addition to members of the user's personal social circle.

At block 406, verification of the identity of the user begins to ensure the person attempting to register is indeed who he/she purports to be. Verification may occur in at least one manner. In one possible embodiment, at block 408, physical or electronic credentials are checked by the system, or by a combination of system-provided resources and third parties performing in-person verification. Physical credentials could include identification cards or other physical objects, for example passports and the like which could be used to verify the identity of the user, and physical characteristics of the user (biometric data, etc.). Electronic credentials could include any identifying data that could be checked against another source or database. Merely by way of example, information known, or probably only known to the user, including a Social Security number, mother's maiden name, prior places of residence and/or employment, biometric data, etc.

Alternatively or additionally, at block 410 the process previously discussed with regard to FIGS. 1 and 2 could be employed to check with those identified in the social circle to verify the identity of the user. Members of the social circle who have previously been identified and verified as trusted authentication agents for other users could be trusted, or assigned higher trust value, to make this identification of the new user. In similar fashion, if a verification agent already is a registered user of the system having his/her own profile and respective circle of authentication agents, it will inherently assign higher trust value to this user acting as a verification agent for another user.

At block 412, it is determined whether information collected at blocks 408, 410 is sufficient to verify the identity of the user attempting registration. If such information is sufficient, then at block 416 the user is verified, and the reliability of each member in the social circle is determined, to be further dynamically maintained and updated over time at block 418. The reliability of each member in the social circle determines what weight a positive confirmation of identity from the member will carry during an authentication process. The identities of the members of the social circle, as well as their reliability, may be stored in a profile for the user for future use during authentication processes as described with regard to FIGS. 1 and 2. In some embodiments, the members of the social circle will also be contacted to verify they are willing and able to serve as authentication agents. While in some embodiments relative trustworthiness weight might be assigned and applicable, in others it may not be as relevant, depending on privacy policy and use-case scenarios.

If the identity of the user is not verified, then registration with the system is either denied at block 414, or is done on probationary basis at block 415 resulting in additional subsequent verification steps and procedures done via several possible routes (for example, in-person verification via hardcopy documents (i.e., drivers license, passport, etc.)), at which point user will receive verified status, at block 416, and the full range of functionality and subsequent services provided by the service. Appropriate notifications may be delivered to the user and/or any other system assisting with the registration process. Additional actions, scripts and sequences might be initiated such as, for example, logging all the attempts with associated secondary data points (IP addresses, time, location, etc.) and notifications may be sent to third parties of any attempted, failed, and potentially fraudulent registration attempts, including for example credit reporting agencies, law enforcement, and/or third parties associated with the real individual for which registration was attempted (the real individual, their employer, etc.).

Exemplary Instance of Social Circle

Figure 5:
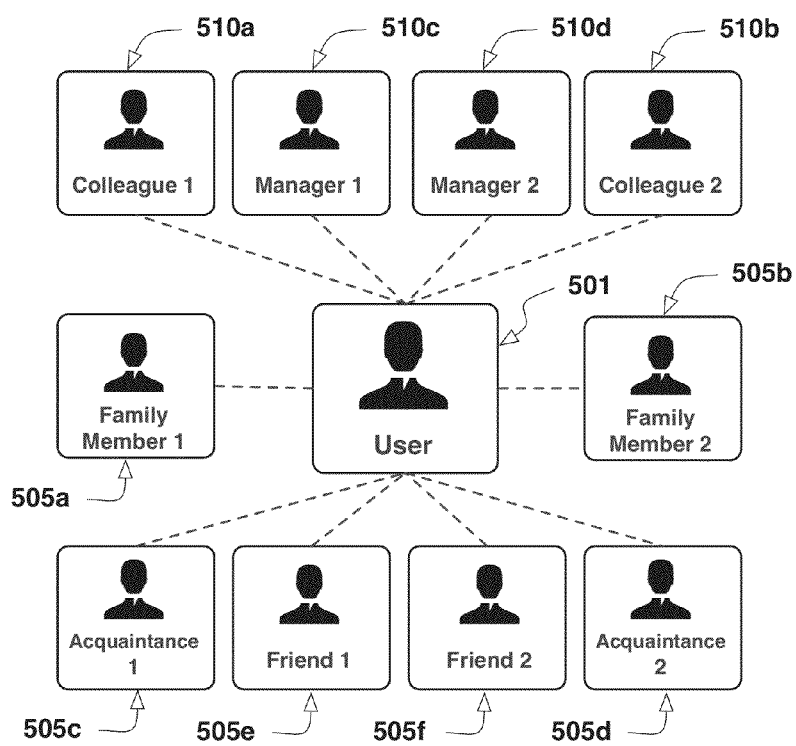
FIG. 5 is a block diagram illustrating an example social circle of a user.

FIG. 5 shows an example social circle 500 of a user in some embodiments. The example social circle 500 shows a combination of pre-approved identification agents 505, as provided by the user 501 during registration, together with required identification agents 510 due to additional security policies that may be present for access to certain systems or methods, potentially of a certain organization. For some authentications, only some of the pre-approved authentication agents 505 may be selected, and may include family members, friends, and acquaintances. However, for certain authentications, potentially when there are more critical authentications for a given organization, additional authentication agents such as required identification agents 510 may be selected for an authentication process. These required identification agents may include colleagues, managers, designated individuals, government employees, etc.

Figure 6:
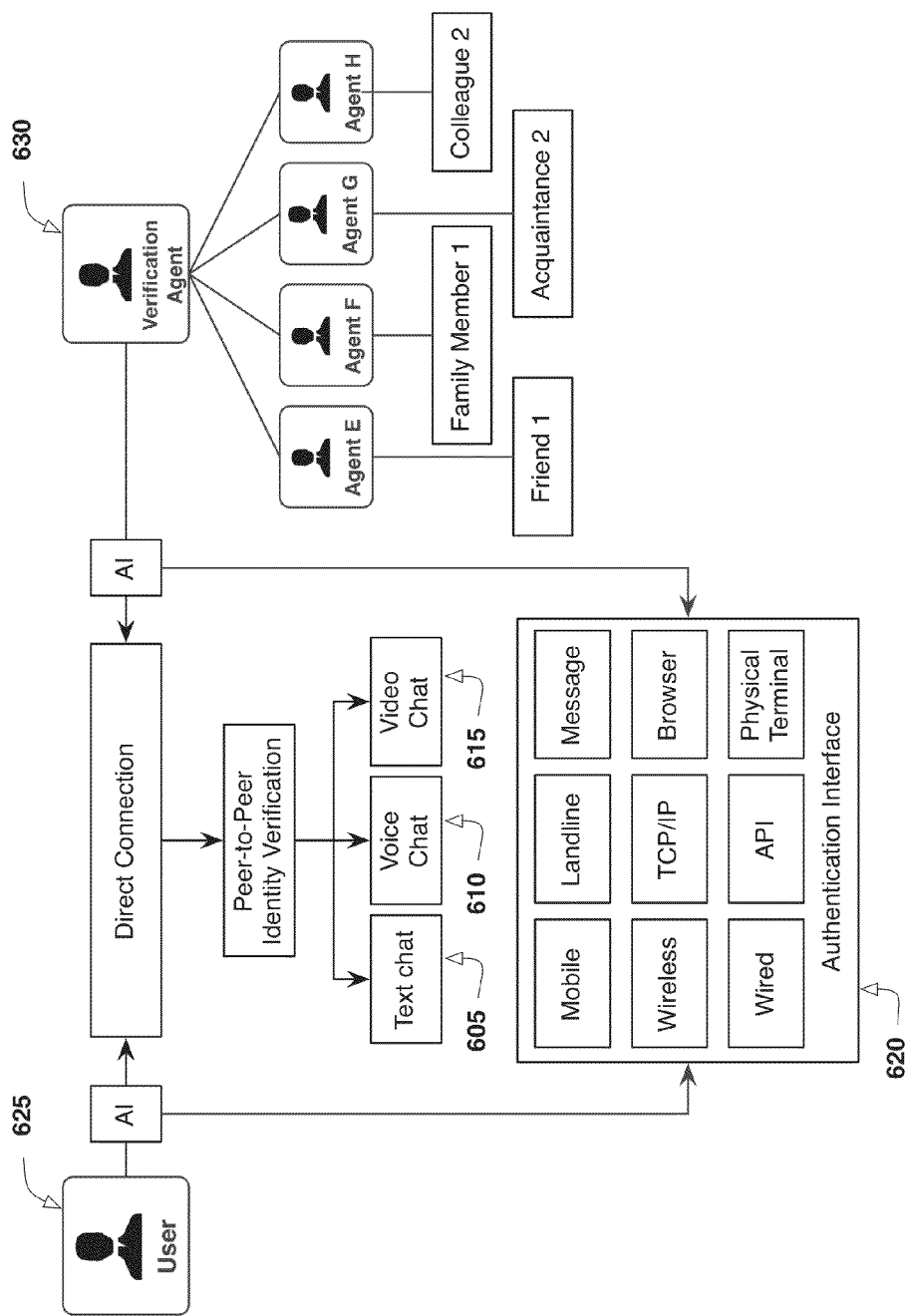
FIG. 6 is a block diagram illustrating an example of a potential implementation of authentication interface and peer-to peer verification.

FIG. 6 shows potential implementations of authentication interface, and peer-to-peer verification link 600 facilitation done via text 605, voice 610, video chats 615 or any combination of these done via a range of connectivity interfaces 620 and communication protocols, such as, but not limited to, wired/wireless connections, TCP/IP, FTP, UDP, HTTP, SSH, OSI, CIP, etc. The user 625/authentication agent 630 facing hardware implementations may vary as long as they can match minimum connectivity/transmission, data capture requirements and can take the form of mobile devices, laptops, desktop computers, terminals, wearable devices, etc.

Figure 7:
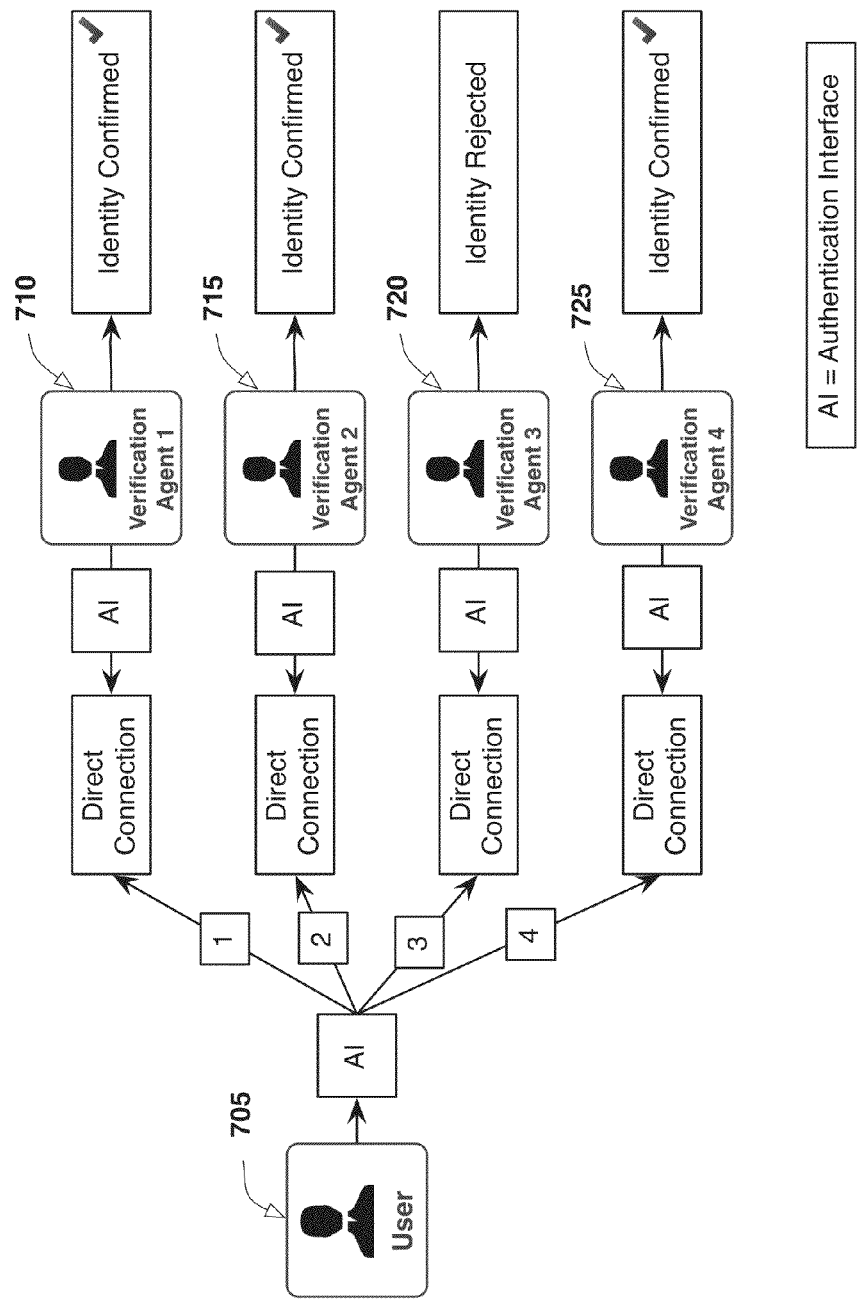
FIG. 7 is a block diagram of an exemplary implementation of real-time authentication agent rotation.

FIG. 7 shows an example 700 of dynamic real-time authentication agent rotation, where once the first (1) authentication session is complete between the user 705 and the first agent 710, the second session (2) is established with a different verification agent 715. The figure shows an example of a false-negative rejection by a verification agent 720, and consequent identity confirmation by the following verification agent 725.

Figure 8:
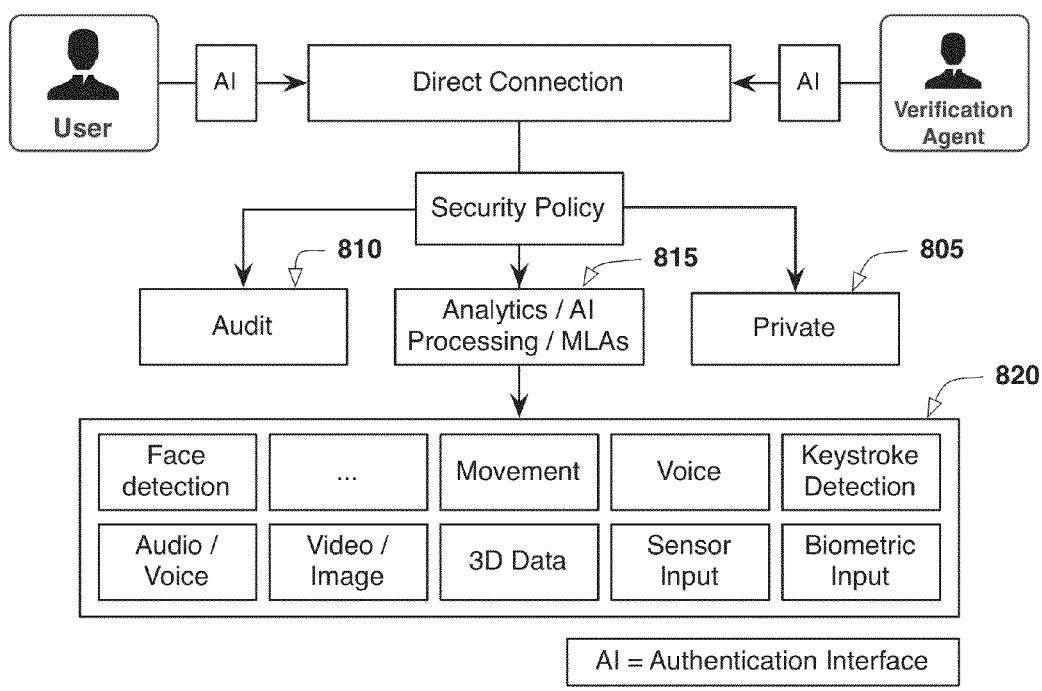
FIG. 8 is a block diagram of an exemplary implementation of additional security policies incorporated in the verification agent module.

FIG. 8 shows an example of additional security policies incorporation 800 for implementations with security requirements, (1) allowing the entire authentication session to remain private 805, (2) allowing the entire session to be recorded for audit or monitored by third parties 810, (3) allowing additional analysis and processing to be performed by means of machine-learning algorithms (MLAs)/artificial intelligence (AI) methodologies 815 for additional levels of verification 820, including but not limited by voice, facial detection, movement, keystroke detection, three-dimensional data, sensory data, biometric data processing and analysis, among others.

In addition to peer-to-peer authentication methodology, the system might employ traditional machine-learning algorithms (MLAs) to analyze the contents of an authentication session for voice patterns, visual patterns, biometric parameters, body language, mimics, facial, iris, physical bone structure and 3D scans among a variety of data streams used for MLA recognition algorithm processing for additional user-verification steps, if necessary. The ability to process multiple streams (audio, video, dedicated 3D, dedicated biometric and other sensory inputs) among a variety of additional biometric signals as an added background verification process (pre-announced to the user) during each peer-to-peer authentication session will ensure constant updates of the secured database (if such database is required based on selected security policy), avoiding situations of stale data, resulting in false negatives. While this functionality is not necessary for peer-to-peer verification, as these technologies have been separately developed, certain organizations, institutions and business might require incorporation of these as added features for audit purposes in compliance with security requirements.

Figure 9:
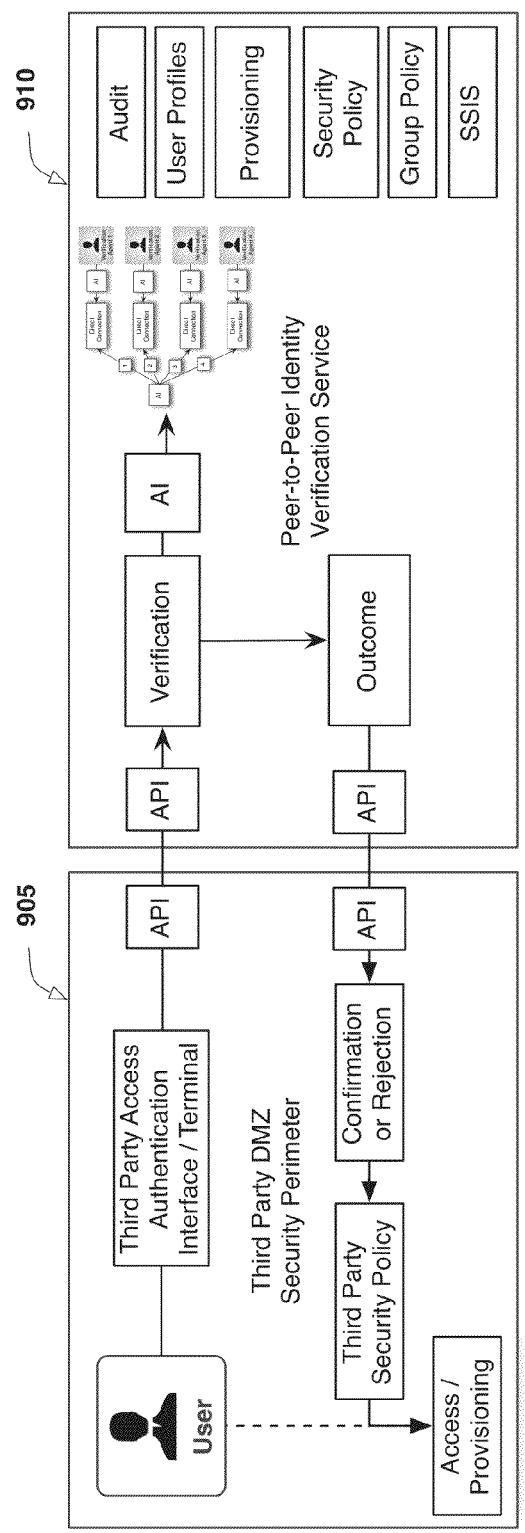
FIG. 9 is a block diagram of an exemplary implementation where a third party uses the user identification system for user verification.

FIG. 9 shows an example of potential implementation 900 where a third party 905 uses the system 910 for user verification, expecting in return a result of the verification session provided via a standardized API.

Figure 10:
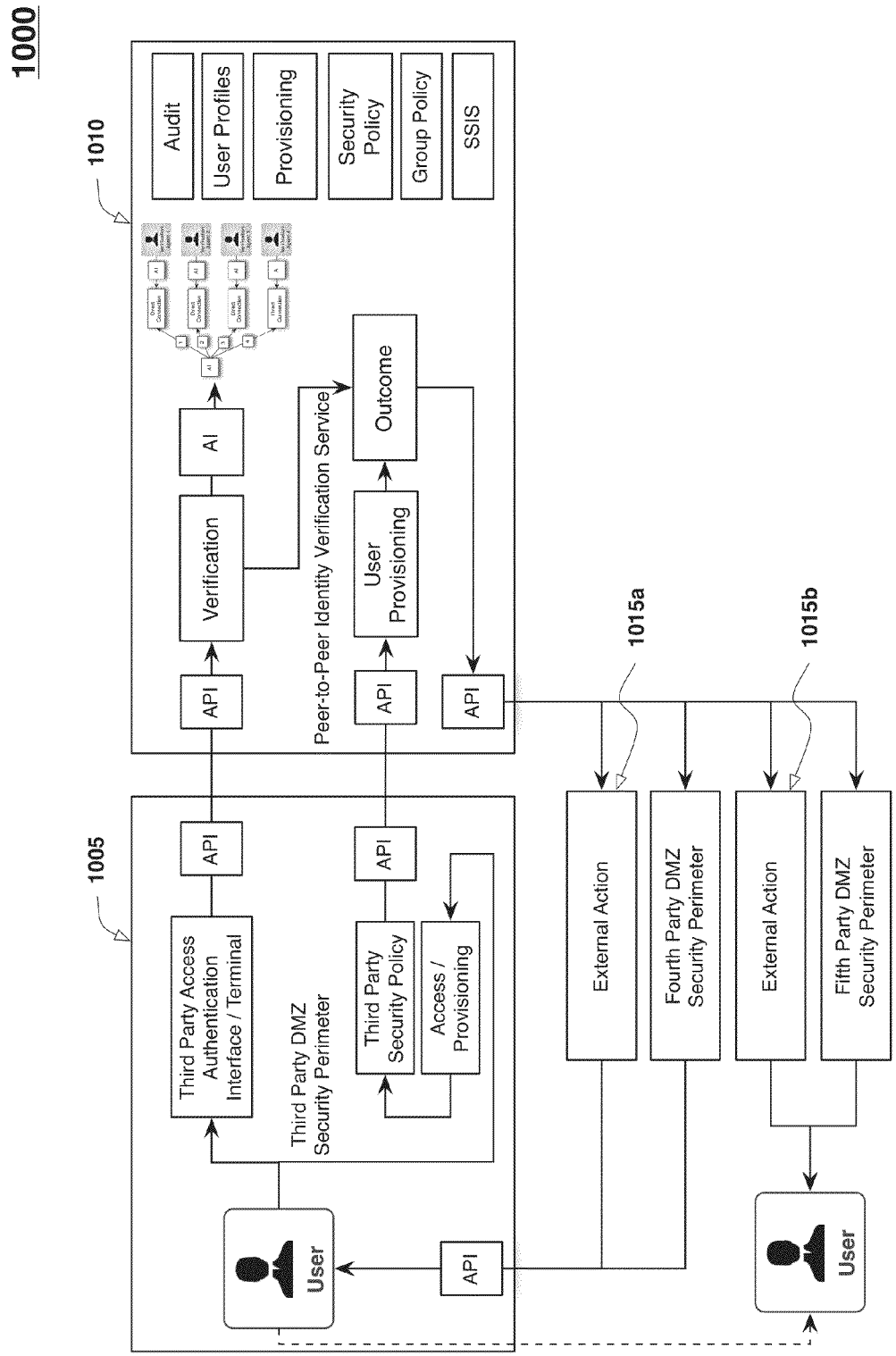
FIG. 10 is a block diagram of an exemplary implementation where a third party uses the system for user verification and provides additional services to the user as per the third party's provisioning rules.

FIG. 10 shows an example of potential implementation 1000 where a third party 1005 uses the system 1010 for user verification and provision of additional services to user as per third party's user specific access/provisioning rules/security policy. In this instance, depending on the outcome of the verification session, the system will initiate a series of algorithms/processes/external actions 1015, potentially interacting with and engaging other external parties/services, or directly with the user outside of third party's DMZ (perimeter security network or sub-network).

Figure 11:
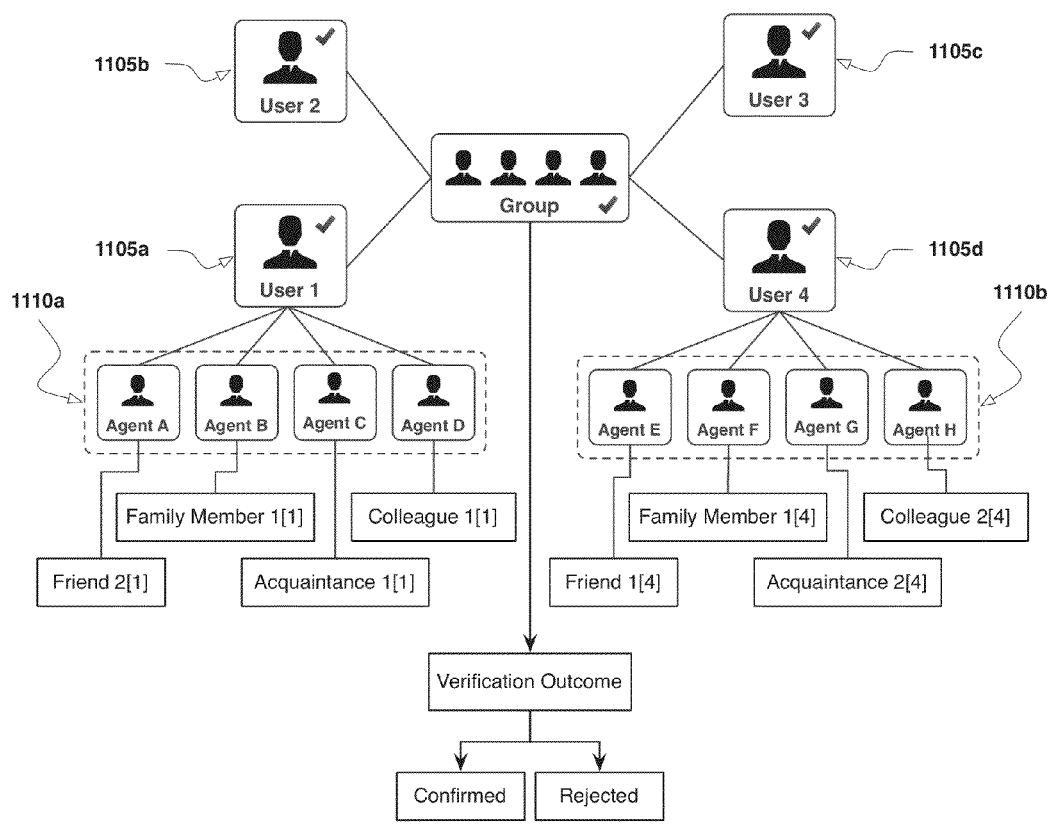
FIG. 11 is a block diagram of an exemplary implementation of multi-user group verification, where each member of the group is separately verified.

FIG. 11 shows an example 1100 of multi-user group verification, where each member 1105 of the group is separately verified by his/her respective group of verification agents 1110, based on each respective user's profile. Only after all of, or at least a predetermined portion of, the members of the group are verified does the system extend authentication/verification for access/provision of authorization/access.

Security Considerations

Figure 12:
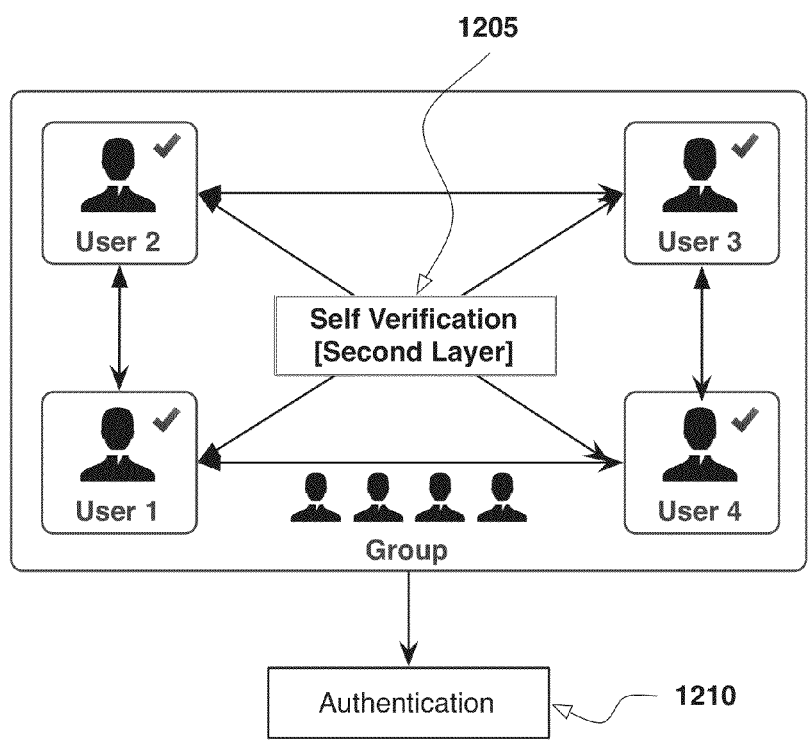
FIG. 12 is a block diagram of an exemplary implementation of multi-group user verification where after each respective member of the group is confirmed, all or selected group members perform a second layer of verification.

FIG. 12 shows an example 1200 of a multi-group user verification where after each respective member of the group was confirmed (FIG. 11), all or selected group members perform second layer of verification 1205, confirming either each other's identities or enabling additional features/options/functions, at which point the system provides authentication/verification for provision of authorization/access 1210 to a particular subset of options/features. Such group-level implementations are critical for environments where, for example, database access or production code changes can only be done (push, pull, get, etc.) when all team members are available live and provided respective confirmations in real time or close to real time. Such tight security measures might be necessary for access to protected customer data, production code updates, certain facilities, and/or additional/critical system functionality.

Figure 13:
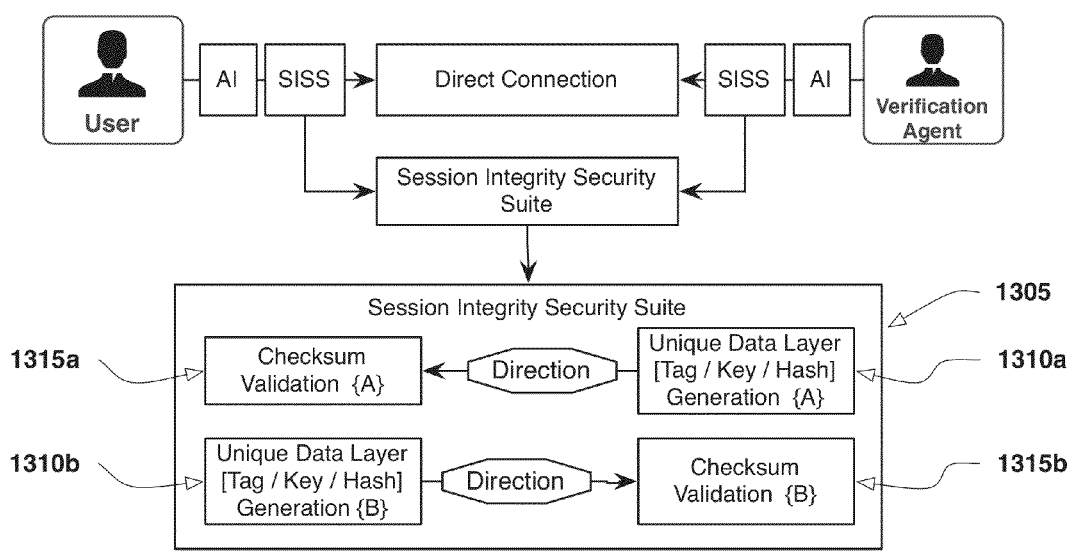
FIG. 13 is a block diagram of an exemplary implementation showing the incorporation of a session integrity security suite.

FIG. 13 shows an example 1300 incorporation of session integrity security suite 1305, generating a unique set of tag/key/hash/data mask combinations 1310 in each direction and providing comparison, delta calculation, validation either via checksum 1315 or other validation methodologies.

The system has the flexibility to incorporate additional data overlays, hashes, and tags for each respective bi-directional authentication session, while ensuring data overlays are unique in each direction (A→B≠B→A) and never repetitive from session to session. The system has the flexibility to keep a separate record of (1) generated data-overlays and (2) received/captured data-overlays to provide real-time checksum verification between the generated and received data overlays, minimizing man-in-the-middle intrusion potential. The ability to keep a separate record of data-overlays for audit purposes, while keeping authentication sessions private (not storing any personal details of the authentication session), provides additional privacy options to users choosing to ensure no private details are stored in applications where security policy provides such flexibility.

Figure 14:
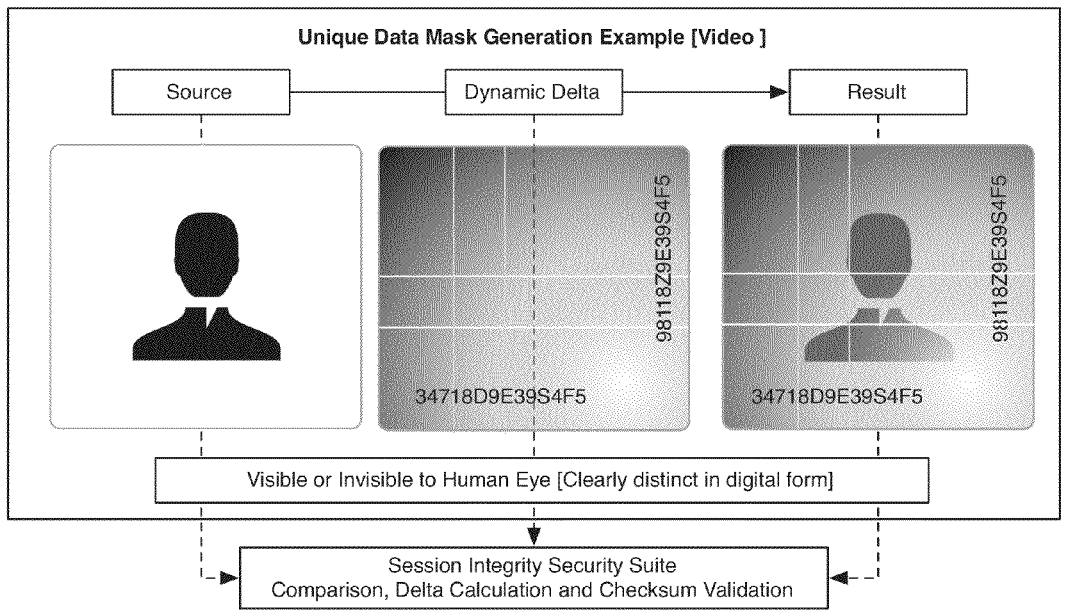
FIG. 14 is a block diagram showing an example of a unique data mask generation for security purposes as one of the applications.
Figure 14:
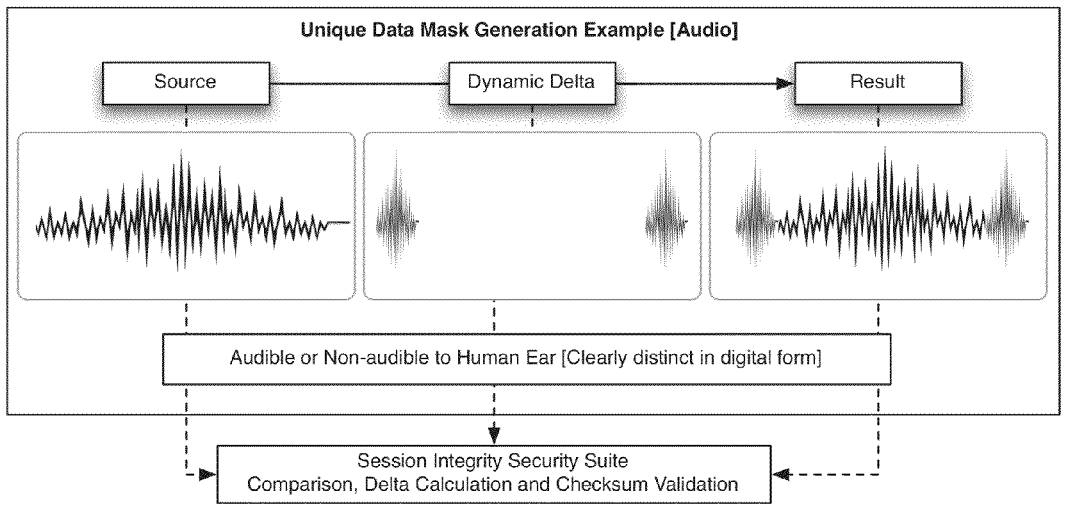

FIG. 14 shows an example 1400 of unique data mask/layer generation, whether visible or invisible to human eye, audible or non-audible to human ear, but clearly distinct in digital form.

Due to security concerns in corporate, federal, high-security environments, the security policy might require for the authentication agents (B) to have minimal ability to guess from what location or for what reasons the user (A) requires authentication. In these instances, the system has the ability to dynamically analyze and process the input from data/audio/video/sensory feeds of the user's (A) device and either remove completely or substitute any background data details (unnecessary from authentication standpoint) from which authentication agents might guess any details/reasons/purposes behind the authentication request.

The system might substitute the background details and/or incorporate additional data overlays (visible, or invisible, audible, or non-audible, while digitally distinct) with either randomly generated data or purposefully selected details to ensure connection integrity and minimize risks of intrusion attacks. In these instances, the system keeps records of both the original pre-processed data feed and the post-processed data feed for audit purposes. The same procedure of minimizing background details may equally be applicable in reverse to authentication agents themselves, if agents prefer not to reveal the details of their surroundings to the user during the verification session due to privacy concerns and/or security policy of the environments they might be in. The system provides two-way privacy controls to users and authentication agents, while ensuring data integrity necessary for valid verification session.

Figure 15:
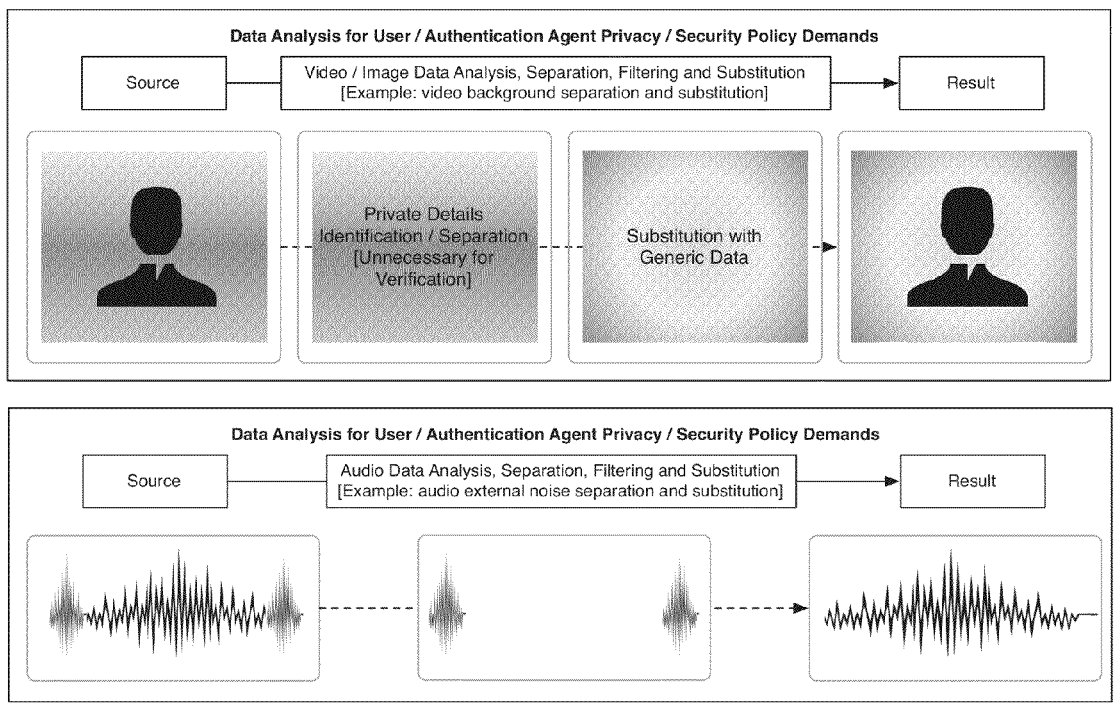
FIG. 15 is a block diagram showing an example of a data analysis for an authentication agent incorporating privacy and security demands.

FIG. 15 shows an example 1500 of user/authentication agent privacy considerations that process and separate background (audio, video, etc.) details, unnecessary for user identity verification process, but are required to be kept private to ensure the privacy of each respective party (user and authentication agent). The system performs video/image/audio data analysis, separation, filtering and substitution necessary from privacy standpoints, without affecting the nature of interaction between user and respective verification agent.

Depending on specific applications, user choices, federal regulations, and legal considerations the authentication session between user and agent might be kept completely private without a need to record the content, while keeping granular record of the session itself (time, length, endpoints, addresses, anomalies, etc.) for audit purposes, whereas in other instances it might have to be recorded and securely stored for a defined period of time for audit purposes.

Robustness and Power of this Method and Process Against Intrusions and Conspiracies Stemming from Rogue Elements Combining both traditional social connections (family, friends, colleagues) with required security (corporate, management) members further reduces false positives (intrusions) in high-security situations where a management/supervisor level employee acts as a rogue element providing system access via credentials of a lower-ranked employee to a third party. In this instance, the third party acts as an intruder using credentials of a lower-level employee (user) while receiving real time authorization by a rogue supervisor, leveraging the system where parallel two-user/multi-tier authentication is required for access. In this instance, even though an intruder has access to credentials of a user (lower-level employee) and has authorization access from the supervisor, an access will not be granted to the intruder as he/she will fail authentication by members of the user's social circle (family, friends, colleagues).

Leveraging the fact that members of subject's social circle are acting as verification agents evaluating the user's identity, the amount of common factors between any {user:verification-agent} pair exceeds any potential number of keys a user might have to remember. The common identification factors are naturally updated on a daily basis as the user continues to engage in his/her social engagements with family, friends and colleagues. The current system does not require any specific personal data points to be memorized by a user, or be stored in a database for matching by a service provider. Any storage of personal details, or answers to personal security questions, subject the service provider to additional intrusion risks, and, if there is a breach, expose user's personal details to intrusion via a different third-party service provider, where the user had previously provided the same answers to the security questions, providing additional vectors of attack. Regardless of how personal or rare these questions are, it takes one security breach at any of the multiple providers, to expose user's personal details to security breaches at other vendors.

Nature of Peer-to-Peer Verification Process, Method and Service

Peer-to-peer verification broadens and deepens quality of identification and user verification by increasing quantity and precision of identification factors between the subject and verification agent, strengthening the security by avoiding stale data, as the social interactions between subject and verification agent are naturally updated (in human memories—neuronal synapses) with the flow of time. The evolving nature of data points between subject and verification agent reduces the risk to a service-provider as much as to the end user, as personal details do not have to be stored due the fact that verification takes place in a peer-to-peer fashion. Consequently, users do not have to remember any specific pre-agreed sequences or pass phrases, since the memories, and mutual dynamics between an individual user and a verifying agent, such as gestures, emotions and feelings from mutual experiences substitute traditional key/pass/public/private combinations in a natural way. Relying on natural memories, behaviors and interaction patterns of individuals provides a multi-dimensional space of parameters and expressions that is more challenging to recreate or replicate without being exposed.

As a result, users do not have to remember multiple sequences that have to be cycled over time. The fact that human memory tends to remember the most recent events with the most clarity, the current system relies on a natural refresh cycle of the authentication data points between a user and an agent, while ensuring data validity and accuracy, as both members will naturally tend to remember memories from the most recent past. In case there is a concern for potential identity mismatch, since an authentication session takes place in real time or close to real time, it is much quicker for the authentication agent to verify the user's identity further by referencing some of the older memories/events of mutual relevance.

Ongoing Quantitative and Qualitative Assessment and Dynamic Adaptation of Authentication Session Parameters and Security Requirements The system dynamically adjusts for situations in which any particular authentication session results in a false negative result, where an authentication agent reverts with a rejection, not being able to confirm the user's identity though the real identity does match the user. An authentication agent might revert with a rejection to an authentication session for multiple temporary reasons, including but not limited to lack of attention, sleepiness, pranks, bad mood, personal problems, anger, external environmental factors (medications, intoxication, etc.). In these situations, the system will record failed authentication attempt, but will let another opportunity for user's identity to be verified with a different authentication agent. The system allows defining the number of failed attempts before preventing another authentication attempt via the same authentication interface for a certain period of time, while initiating additional procedures to notify the user and selected members of user's social circle of the potential authentication threat.

The system provides a secure protocol for a user's social circle of verification agents to be updated over time, depending on mutual dynamics between the user and verification agents with the flow of time as social connections appear and disappear, and/or strengthen or weaken over time.

Infinite Natural Depth and Data Granularity of Verification Parameters

As an added benefit, the peer-to-peer verification nature of this identity verification process provides an additional safety margin as one's social circle has a much deeper knowledge of the user's location, personal habits, traditions, actions and behaviors which will facilitate identification of an anomaly and prevent false positives (intrusion). Vice versa, deeper understanding of a user's recent past, by authentication agents, minimizes false negatives in situations where a user's behavior might deviate from the norm either due to travel, extra added work, lack of sleep, personal situations, change in appearance or behavior for natural reasons (illnesses, surgeries, haircuts/tanning/style changes, medications, etc.), that might affect traditional identity verification methodologies. In these situations authentication agents are most likely to be aware of the reasons behind these either short-term or permanent fluctuations in a user's appearance/behavior, and will be much more receptive in deciphering possible explanations a user might provide.

One advantage of peer-to-peer identity verification workflow may be the minimal amount of information stored by the service providers. In the event of targeted attack and consequent security breach, even if the information could be decrypted from salted hashes, the only details available would be contact details of members of one's social circle. With the prevalence of social networks and the connectivity trail users leave behind in their day-to-day activity these data points (user's social connections and their contact details) are already publicly available or can be recreated with a relative ease for a committed intruder or an interested party.

Even if an intruder gains access to these contact details the system would not let the intruder use these details for actual verification and consequent system access, as access relies on peer-to-peer approval and not on any of the details stored by the service-provider (most likely available in public anyway). In some implementations, the systems and methods do not require storage of personal details (first name, last name, DOB, etc.), though such an option is available; the only minimal requirement is the contact details (some form of communication channel) for the vetted members of one's social circle. Not storing personal details of the underlying users (if necessary), but storing just one's chosen and vetted social connections (verifying agents) with respective contact details, provides additional anonymity, as the connection data can be stored without a need to store person-specific identification information.

Additional Potential Advantage: No Privacy Requirement

One of the differentiating advantages of some embodiments may lie in the fact that the authentication sessions can be held in public, as the user is not required to exchange any confidential details with an authentication agent, unless an authentication agent specifically asks for it. The nature of live interaction, between individuals who have known each other for an extended period of time, is that the inherent meanings behind words and expressions can be portrayed in live conversation (via text, voice, expressions, visual movements, etc.) without a need for individuals to exchange confidential details about each other; hence authentication sessions can take place in the public domain.

Another possible additional advantage of such a peer-to-peer authentication mechanism, allowing for additional checks against false negative man-in-the-middle intrusion attempts, such as trying to record/replay/recreate one's identity based on previous sessions, for example, may be that each authentication session between user and the same authentication agent will never be the same, since these sessions can take place at any point of time, subject to broader environmental developments surrounding us; hence authentication details are naturally updated.

Communication Channel Data Processing for Privacy Considerations

If the authentication session takes place in a public domain and is subject to eavesdropping, the system provides a flexibility to minimize the exposure of an authentication agent's (B) identity to the public domain of the environment in which user (A) resides at the moment of the authentication session. For example, while maintaining the connection, user (A) can choose not to show the video feed of the verification agent (B) on the screen of the user's authentication device, minimizing the exposure of verification agent's identity. At the same time, verification agent (B) continues to receive full audio, video, textual and sensory inputs from the user's end. The same functionality is available for verification agent (B), in a public situation, who prefers to provide additional privacy to user A, while ensuring that the verification agent has enough data points available necessary to validate the user identification session.

The system may ensure that the authentication agents are not made aware of the user's purposes beyond the authentication request. A quid-pro-quo incentive system ensures integrity of peer-to-peer verification. The system incorporates a suite of initial user-validation steps to minimize potential for abuse by third-parties and intruders, for example, trying to perform distributed attacks by attempting to issue multiple authentication requests on behalf of a specific user trying to disturb a user's underlying social circle.

Additional Implementation for Multi-User Group Environments

The functionality of the system further extends to group environments where security measures require multiple team members to be present to facilitate access or extend additional functionality. In multi-member group interactions, verified participants can verify identities of other members in real time to allow additional verification prior to provision of access. Once respective identities have been verified for all members of the team, the system can automatically provide confirmation and extend authentication for access. This functionality can be applicable, for example, to extending security for systems where, for example, database access, production code changes or additional functionality can only be provided after all team members are available, their identities have been verified as per security policy and each member provided confirmations for the system to provide further authentication access to the entire group or a subset of the group. Use of standardized APIs for this purpose avoids situations where remotely connected intruders are able to utilize user credentials to gain unauthorized access to production systems/databases, even if intruders gain parallel access to multiple systems in real-time. Having real-time user verification of in-group environments, as well as intra-group user/access confirmations as a second layer of verification, adds an additional security barrier against intrusion attacks.

Standardized API

The system provides a standardized application-processing interface (API) for external access, usage and implementation. The system provides flexibility (1) for third parties to use it solely for the identity verification purposes of the underlying users (verification subjects), resulting in standardized and encrypted responses on the outcome of the identity verification sessions, (2) for third parties to rely on the system to provide directly to users (verification subjects) specific pre-defined or dynamically defined data sets, links, access and control, additional functionality to verification subjects, (3) for third parties to rely on the system to interact and render services between users and fourth parties, or a combination of the above.

Dynamic Analytics, Processing, and Authentication Security Adjustments

For each respective authentication session the system dynamically analyzes a variety of input parameters to assign a trustworthiness score to each data point and an authentication agent decision (whether confirmation or rejection). For example, depending on the time of the day, there might be significant variability in incoming sensory data used for conditional matching, as well as the ability of a verification agent to be effective in making a correct verification decision. As an example, the system would rather avoid reaching out to verification agents who are in a time zone where it is the middle of the night, and would rather reach out to verification agents who are awake and likely to be more effective in decision-making. However, if the system has no choice but to reach out to a verification agent in the middle of the night, it will assign a lower trustworthiness score to the result submitted by that particular verification agent. Similar logic applies to any external data points provided in machine-readable format, as any data is subject to variability, cyclicality and pattern-like behavior that should be dynamically accounted for when dealing with data deviations.

Parameter Conditionality Based on External Authentication Inputs

In another embodiment, the system and process facilitate not only the authentication of identity but provide the ability for the verification agents to verify additional conditionality associated with a user being verified. For example, the system might not only request to verify that the user's identity matches, but also that a user is located at a certain location, at a certain time point, slept for eight hours the night before, has blood with an alcohol or pharmaceutical content below a certain level, has a blood chemical composition that matches a certain profile, is well rested, among a variety of other potential conditions a user might have to be required to match. This is particularly relevant in applications where additional conditions are critical for further authentication and access. For example, the system will ensure for public transport operators (drivers, pilots, etc.) to match certain health checks in addition to verifying their identity prior to providing access to operation of public transport machinery or performance of other functions.

In this embodiment, the system may or may not use pre-defined verification agents for additional conditionality checks; for example, a border patrol agent may verify additional parameters, or a delivery man may verify that the user is physically located in front of the house, performing a specific task required to match the condition of the verification.

In this embodiment, additional parameters for conditionality checks may be provided and based on inputs from previously vetted verification agents (assigned to user's profile) as well as randomly selected verification agents whom the user might have not known before, unrelated third parties, or other services and devices.

External Agents Outside of User's Established Social Circle

In this embodiment, the system will dynamically identify potential verification agents, systems or processes based on a certain set of rules and assign an agent whom a user might have not known in the past to verify that the user in question satisfies a certain condition, such as being in a certain location, being awake, doing a certain task, as simple examples. These individuals or third parties might not know this particular user in person, but by matching certain criteria or a set of conditions, such as being in the same location at the same time, external unrelated individuals and systems might provide additional conditional inputs for overall verification purposes. Other systems and processes might act as partial verification agents to provide additional data points to the service to assist in a decision as to whether these parameters match the conditional requirements for user verification.

As a potential case, it might happen on random occasion that both the user and one of the dynamically selected verification agents might be in direct proximity to each other and it will not take more than a second for the verification agent to confirm the user's identity even without requiring establishing a direct communication link between the two as they are already next to each other and do not need to be connected via a separate communication interface. While in that instance establishing the actual live-time connection might not be necessary as in reality it is redundant, the service will guarantee the authenticity of verification and ultimate authentication and authorization provisioning; hence this process will still be interacting with each respective pair of individuals.

Collective Wisdom

While each verification agent might provide its respective input or data point to the service, it is the aggregate intelligence of all data points collected securely by the service across a variety of sources via a variety of public and private communication channels, cross-matched against the predefined set of authentication rules and conditions for each respective application, that results in the high reliability and trustworthiness of the authentication decision and the underlying logic. {ESSDKISSMISS}

The invention has now been described in detail for the purposes of clarity and understanding. However, it will be appreciated that certain changes and modifications may be practiced within the scope of the appended claims.

What is claimed is:

1. A machine-implemented method of authenticating the identity of a user who is a human being, the method comprising:
    registering the user, wherein registering the user comprises
        receiving identification of a plurality of persons associated with the user and a communication address for each of the plurality of persons;
    receiving a request to authenticate the identity of the user;
    selecting at least one of the plurality of persons to serve as an authentication agent;
    initiating at least a first communication between the user and the authentication agent via the communication address, wherein the first communication is live between the user and the authentication agent;
    receiving a second communication from the authentication agent; and
    sending a message indicating the identity of the user is authenticated based at least in part on the second communication including a confirmation of the identity of the user.

2. The machine-implemented method of authenticating the identity of a user who is a human being of claim 1, wherein registering the user further comprises:
    verifying the identity of the user.

3. The machine-implemented method of authenticating the identity of a user who is a human being of claim 1, wherein registering the user further comprises:
    receiving a communication address for the user.

4. The machine-implemented method of authenticating the identity of a user who is a human being of claim 1, wherein receiving the request to authenticate the identity of the user comprises:
    receiving the request from the user.

5. The machine-implemented method of authenticating the identity of a user who is a human being of claim 1, wherein receiving the request to authenticate the identity of the user comprises:
    receiving the request from a third party.

6. The machine-implemented method of authenticating the identity of a user who is a human being of claim 1, wherein selecting at least one of the plurality of persons to serve as an authentication agent comprises:
    determining that at least one security requirement applies to the request; and
    selecting at least one of the plurality of persons is based at least in part on the at least one security requirement.

7. The machine-implemented method of authenticating the identity of a user who is a human being of claim 6, wherein the security requirement comprises:
    a requirement that at least one selected person be a person not specified by the user.

8. The machine-implemented method of authenticating the identity of a user who is a human being of claim 6, wherein the security requirement comprises:
    a requirement that a minimum number of persons be selected.

9. The machine-implemented method of authenticating the identity of a user who is a human being of claim 1, wherein the method further comprises:
    determining a trustworthiness of at least one of the plurality of persons.

10. The machine-implemented method of authenticating the identity of a user who is aha human being of claim 9, wherein sending a message indicating the identity of the user is authenticated is further based at least in part on:
    the trustworthiness the authentication agent.

11. The machine-implemented method of authenticating the identity of a user who is a human being of claim 1, wherein initiating at least a first communication between the user and the authentication agent via the communication address comprises:
    initiating at least one communication between the user and a server; and
    initiating at least one communication between the server and the authentication agent.

12. The machine-implemented method of authenticating the identity of a user who is a human being of claim 1 wherein initiating at least a first communication between the user and the authentication agent via the communication address comprises:
    initiating a direct communication between the user and the authentication agent.

13. The machine-implemented method of authenticating the identity of a user who is a human being of claim 1, wherein the method further comprises:
    sending a message indicating the identity of the user is not authenticated based at least in part on the second communication including an indication that the identity of the user is not authenticated.

14. The machine-implemented method of authenticating the identity of a user who is a human being of claim 1, wherein the method further comprises:
    sending a query to a person who is not one of the plurality of persons associated with the user;
    receiving a response to the query; and wherein sending the message indicating the identity of the user is authenticated is further based at least in part on the response to the query.

15. A non-transitory computer-readable medium containing instructions stored thereon for implementing a method of authenticating the identity of a user of a client device, wherein the user is a human being, and the method comprises:
- sending, from the client device to a remote server, a request to authenticate the identity of the user;
- receiving, at the client device from the remote server, a first instruction to initiate at least a first communication between the user and a first authentication agent, wherein:
  - the first authentication agent is a first person; and
  - the first communication is live between the user and the authentication agent;
- initiating, with the client device, the first communication; and
- receiving, at the client device from the remote server, a message indicating the identity of the user is authenticated based at least in part on a second communication received by the remote server from the first authentication agent confirming the identity of the user.

16. The non-transitory computer-readable medium containing instructions stored thereon for implementing a method of authenticating the identity of a user of a client device of claim 15, wherein the user is a human being, and wherein the method further comprises:
- receiving, at the client device, from the remote server, a second instruction to initiate at least a third communication between the user and a second authentication agent, wherein:
  - the second authentication agent is a second person; and
  - the third communication is live between the user and the second authentication agent;
- initiating, with the client device, the third communication; and
- wherein the message indicating the identity of the user is authenticated is further based at least in part on a fourth communication received by the remote server from the second authentication agent confirming the identity of the user.

17. The non-transitory computer-readable medium containing instructions stored thereon for implementing a method of authenticating the identity of a user of a client device of claim 15, wherein the user is a human being, and wherein the method further comprises:
- sending, from the client device, to the remote server, information independent of the first communication to the server; and
- wherein the message indicating the identity of the user is authenticated is further based at least in part on the remote server comparing the information independent of the first communication to stored information associated with the user.

18. A server configured to authenticate the identity of a user who is a human being, the server comprising:
- a processor; and
- a storage medium comprising instructions executable by the processor for:
  - receiving a request to authenticate the identity of the user;
  - selecting at least one of a plurality of persons to serve as an authentication agent;
  - initiating at least a first communication between the user and the authentication agent, wherein the first communication is live between the user and the authentication agent;
  - receiving a second communication from the authentication agent; and
  - sending a message indicating the identity of the user is authenticated based at least in part on the second communication including a confirmation of the identity of the user.

19. The server configured to authenticate the identity of a user who is a human being of claim 18, wherein the storage medium further comprises instructions executable by the processor for:
- registering the user by receiving identification of the plurality of individuals associated with the user.

20. The server configured to authenticate the identity of a user who is a human being of claim 19, wherein the identification of at least a portion of the plurality of individuals associated with the user is not received from the user.

* * * * *

UNITED STATES PATENT AND TRADEMARK OFFICE
CERTIFICATE OF CORRECTION

PATENT NO.        : 9,094,388 B2                                            Page 1 of 1
APPLICATION NO.   : 13/875218
DATED             : July 28, 2015
INVENTOR(S)       : Dmitri Tkachev It is certified that error appears in the above-identified patent and that said Letters Patent is hereby corrected as shown below:

In The Specification

In the DETAILED DESCRIPTION OF THE INVENTION:

Column 20, Line 35, please replace "aha" with --a--.

Signed and Sealed this
Fifth Day of January, 2016

Michelle K. Lee
*Director of the United States Patent and Trademark Office*